United States Patent
Tanaka et al.

(10) Patent No.: US 8,010,792 B2
(45) Date of Patent: Aug. 30, 2011

(54) CONTENT TRANSMISSION APPARATUS, CONTENT RECEPTION APPARATUS AND CONTENT TRANSMISSION METHOD

(75) Inventors: Mayuko Tanaka, Yokohama (JP); Hiroo Okamoto, Yokohama (JP); Yoshimichi Kudo, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1463 days.

(21) Appl. No.: 10/846,558

(22) Filed: May 17, 2004

(65) Prior Publication Data

US 2005/0160265 A1    Jul. 21, 2005

(30) Foreign Application Priority Data

Jan. 16, 2004  (JP) ................................ 2004-008621

(51) Int. Cl.
H04L 9/32    (2006.01)
(52) U.S. Cl. ....................................................... 713/168
(58) Field of Classification Search ................... 713/168
See application file for complete search history.

(56) References Cited

U.S. PATENT DOCUMENTS

| | | | |
|---|---|---|---|
| 5,319,705 A | | 6/1994 | Halter et al. |
| 5,708,713 A | * | 1/1998 | Harte ............................. 713/169 |
| 5,715,403 A | | 2/1998 | Stefik |
| 6,058,476 A | | 5/2000 | Matsuzaki et al. |
| 6,282,653 B1 | | 8/2001 | Berstis et al. |
| 6,434,478 B1 | * | 8/2002 | Ikeda ............................. 701/200 |
| 6,538,558 B2 | | 3/2003 | Sakazume et al. |
| 6,629,246 B1 | * | 9/2003 | Gadi ................................. 726/8 |
| 6,684,254 B1 | * | 1/2004 | Dutta ............................. 709/229 |
| 6,782,260 B2 | | 8/2004 | Nakakita et al. |
| 7,058,414 B1 | * | 6/2006 | Rofheart et al. ........... 455/456.4 |
| 7,127,234 B2 | | 10/2006 | Ishii |
| 7,287,282 B2 | | 10/2007 | Yamada et al. |
| 7,296,147 B2 | | 11/2007 | Matsuzaki et al. |
| 7,324,644 B2 | | 1/2008 | Saito |
| 7,370,112 B2 | | 5/2008 | Saito et al. |
| 7,411,607 B2 | | 8/2008 | Kikugawa |
| 2002/0027992 A1 | * | 3/2002 | Matsuyama et al. .......... 380/231 |

(Continued)

FOREIGN PATENT DOCUMENTS

CN        1392706        1/2003

(Continued)

OTHER PUBLICATIONS

B. Zujie, Online Life, Network Speed Testing, pp. 1-3.

(Continued)

*Primary Examiner* — Kambiz Zand
*Assistant Examiner* — Teshome Hailu
(74) *Attorney, Agent, or Firm* — Antonelli, Terry, Stout & Kraus, LLP.

(57) ABSTRACT

A copyright of a content is protected by preventing creation of illegal copies of the content and the content is prevented from being transmitted beyond a range of personal use in a process to transmit the content through a LAN.

Before transmission of a content, a content transmission apparatus and a content reception apparatus perform a determination of authentication information available in a predetermined command accompanying authentication information, or an authentication determination based on a time until reception of a response to a predetermined command request accompanying predetermined authentication information. If the authentication is unsuccessful, the requested content is not transmitted to the content reception apparatus. With such arrangement, it is possible to effectively protect a copyright when a content is transmitted by way of a network.

8 Claims, 8 Drawing Sheets

U.S. PATENT DOCUMENTS

| | | | |
|---|---|---|---|
| 2002/0059614 A1* | 5/2002 | Lipsanen et al. | 725/75 |
| 2002/0156705 A1* | 10/2002 | Koyata et al. | 705/27 |
| 2003/0018751 A1* | 1/2003 | Lee et al. | 709/219 |
| 2003/0046541 A1 | 3/2003 | Gerdes et al. | |
| 2003/0061165 A1 | 3/2003 | Okamoto et al. | |
| 2003/0226011 A1* | 12/2003 | Kuwano et al. | 713/155 |
| 2004/0076294 A1 | 4/2004 | Shibata et al. | |
| 2004/0083364 A1 | 4/2004 | Andreaux et al. | |
| 2004/0098583 A1* | 5/2004 | Weber | 713/168 |
| 2004/0193881 A1 | 9/2004 | Ayaki et al. | |
| 2004/0203600 A1* | 10/2004 | McCorkle et al. | 455/411 |
| 2004/0268131 A1 | 12/2004 | Kudo et al. | |
| 2005/0027984 A1 | 2/2005 | Saito et al. | |
| 2005/0114647 A1* | 5/2005 | Epstein | 713/153 |
| 2005/0160274 A1 | 7/2005 | Yukimatsu et al. | |
| 2005/0198330 A1 | 9/2005 | Kawabata et al. | |
| 2005/0210290 A1 | 9/2005 | Ono et al. | |
| 2005/0273608 A1* | 12/2005 | Kamperman | 713/169 |
| 2006/0034253 A1 | 2/2006 | Yurugi et al. | |
| 2006/0265735 A1 | 11/2006 | Ohno | |

FOREIGN PATENT DOCUMENTS

| | | |
|---|---|---|
| CN | 1574726 | 2/2005 |
| JP | 10-271154 | 10/1998 |
| JP | 2000-287192 | 10/2000 |
| JP | 2001-285284 | 10/2001 |
| JP | 2001-358706 | 12/2001 |
| JP | 2002-229950 | 8/2002 |
| JP | 2002-300162 | 10/2002 |
| JP | 2003-132253 | 5/2003 |
| JP | 2003-280778 | 10/2003 |
| JP | 2004-072721 | 3/2004 |
| JP | 2004-343448 | 12/2004 |
| JP | 2005-45756 | 2/2005 |
| JP | 2005-071327 | 3/2005 |
| KR | 2001-0004137 | 1/2001 |
| KR | 2002-0063659 | 8/2002 |
| WO | WO 99/55042 | 10/1999 |
| WO | WO 01/93434 | 12/2001 |
| WO | WO 01/93580 | 12/2001 |
| WO | WO 02/30054 | 4/2002 |
| WO | WO 2004/047371 | 6/2004 |

OTHER PUBLICATIONS

Menezes et al., Handbook of Applied Cryptography, CRC Press, 1997, pp. 397-405.

Douglas E. Comer, Computer Networks and Internets with Internet Applications, Third Edition, pp. 361-372.

Hitachi, Ltd., et al., "5C Digital Transmission Content Protection White Paper", Revision 1.0, Jul. 14, 1998.

Digital Transmission Content Protection Specification, vol. 1 (Information Version), Revision 1.1, Jul. 25, 2000.

* cited by examiner

CONTENT TRANSMISSION APPARATUS, CONTENT RECEPTION APPARATUS AND CONTENT TRANSMISSION METHOD

CLAIM OF PRIORITY

The present application claims priority from Japanese application serial no. P2004-008621, filed on Jan. 16, 2004, the content of which is hereby incorporated by reference into this application.

BACKGROUND OF THE INVENTION

The present invention relates to a content transmission apparatus, a content reception apparatus and a content transmission method that are suitable typically for protecting copyrights of video and audio contents transmitted and received thereby through a network.

With improvement of the processing power of a personal computer (abbreviated hereafter to a PC), the processing speed and the storage capacity of a hard-disk drive (abbreviated hereafter to an HDD) embedded in the PC also increase as well. By the processing power of a PC, the processing speed and storage capacity of the PC are implied. In this situation, even a PC of a rank intended for an ordinary home can be used for recording a TV broadcast program in the HDD to be watched later through a display unit of the PC.

In addition, with the decreasing price of the HDD having a large storage capacity, an HDD video-recording apparatus having such an HDD embedded therein has been introduced also as a home video-recording apparatus for digitally recording audio/video information, and the fact that the user can utilize such a video-recording apparatus with a high degree of convenience by making use of a disk as a recording medium attracts much attention. In recording equipment such as a video-recording apparatus and a PC, which employ the HDD described above, audio/video information can be recorded in an HDD fixed in the recording equipment in a room of a home. Thus, if a user wants to watch the recorded information in another room of the home, the user must move the recording equipment itself to the other room. That is to say, it is difficult to implement an application in which a plurality of video-recording/reproduction apparatuses employing a replaceable recording medium is provided and the audio/video medium is moved from a video-recording/reproduction apparatus installed in a room to another apparatus installed in another room. An example of the video-recording/reproduction apparatus employing a replaceable recording medium is a VTR.

In order to solve the problem described above, there has been conceived a solution in which a video-recording apparatus is provided with an interface with a wire or radio LAN (Local Area Network) and, by transmitting audio/video information recorded at a room of a home from the video-recording apparatus to another PC or reception apparatus installed at any other room of the home by way of the network, the user can watch the recorded information in the other room.

By the way, in order to protect copyrights of information such as contents, a Digital Transmission Content Protection (DTCP) has been provided as a typical copy protection method incorporated in a digital AV apparatus. The DTCP defines a copy protection method on an IEEE1394 bus or the like. For more information on the DTCP, refer to non-patent reference 1, namely, the 5C Digital Transmission Content Protection White Paper authored by Hitachi Ltd., et cetera.

In addition, some technologies have been developed as technologies for implementing copy protection to protect copyrights in the course of transmission between apparatus or transmission through a network. Such technologies are disclosed in documents such as Japanese Patent Laid-open No. 2000-287192 referred to hereafter as patent reference 1 and Japanese Patent Laid-open No. 2001-358706 referred to hereafter as patent reference 2.

SUMMARY OF THE INVENTION

In accordance with the conventional technologies described above, a video-recording apparatus for home applications may be provided with an interface with a wire or radio LAN (Local Area Network) so as to transmit audio video information to another PC or reception apparatus by way of the network, so that a user can watch the audio vide information recorded n any room of a home. In this case, the conventional technologies however do not consider copyright protection of the video audio information whose copyrights should be protected. Audio vide information recorded in an HDD of the video-recording apparatus can be transmitted to another PC by way of a LAN and stored in the HDD of the other PC. Thus, the audio video information handled in this way must be a copy-free content, which can be copied with complete freedom. The audio video information will hereinafter referred to as a content.

In general, when a digitally recorded content is transmitted from one apparatus to another by way of a network or the like for recording as described above, the data quality of the content less deteriorates in the course of the transmission. That is to say, in the apparatus on the reception side, it is possible to generate a copy of a content as a copy with the same quality as the content recorded in the apparatus on the transmission side. It is thus necessary to consider prevention of audio and video data from being created by illegal copying beyond a range of personal use. The audio and video data, the copyright of which should be protected, is referred to hereafter as a content. In transmission of a content between digital AV apparatus, for example, the apparatus on the content transmission side encrypts the content and, only the apparatus on the content transmission side and the apparatus on the content reception side share information for encrypting the content and decrypting the encrypted content. Thus, an apparatus other than the content reception apparatus serving as the sole transmission target of the content is not capable of correctly decrypting the content received from the apparatus on the content transmission side. In this way, it is possible to implement copy protection for avoiding creation of a limitless number of copies.

A typical example of such a copy protection method adopted in digital AV apparatus is the DTCP method disclosed in non-patent reference 1. In accordance with the DTCP method, contents are managed by classifying the contents into 'Copy free', 'Copy one generation', and 'Copy never' categories. In a video-recording apparatus, only contents of the 'Copy free' and 'Copy one generation' categories are recorded. A content of the 'Copy one generation' category can be recorded only once and, after being recorded, the content is handled as a content of the 'No more copies' category. Except a content of the 'Copy free' category, any content is encrypted on a bus in the apparatus on the transmission side prior to transmission to an apparatus on the reception side so as to prevent a limitless number of copies from being created from the content.

Some technologies have been disclosed as technologies for implementing copy protection for protecting the copyright of a content in transmission of the content by way of a wire or radio LAN on the basis of a concept similar to the DTCP method. For example, patent reference 1 discloses a technology applying a technique similar to the DTCP to copy protection for distribution of digital contents through a network. On the other hand, patent reference 2 discloses a technology of building inter-apparatus communications by encryption also for protection of copyrights of contents.

In accordance with these technologies, a content is transmitted from an apparatus on the transmission side to an apparatus on the reception side by way of a wire or radio network by not considering whether or not the apparatus on the transmission side and the apparatus on the reception side are installed at the same home. Rather, in the case of downloading a content from a distribution server, in general, the apparatus on the transmission side is located at the site of the provider and the apparatus on the reception side is located at an ordinary home.

Thus, even though the technologies described above are applied solely to a case in which a content is recorded in an HDD of a PC or an HDD embedded in a video-recording apparatus and then transmitted to another apparatus installed at the same home by way of a LAN provided at the home, a reception apparatus installed at another home connected to the LAN through the Internet is capable of receiving and displaying the content. In addition, the transmission range of the content can be widened to all places in the world provided that the places are connected to the Internet.

Assume that the user of a video-recording apparatus puts the video-recording apparatus in a state of being accessible from the Internet in such a situation. In this case, even if copy protection is applied in accordance with the technologies described above, a reception apparatus will be capable of receiving a content from the video-recording apparatus by way of the Internet with a high degree of freedom and displaying the content, provided that the reception apparatus has the copy-protect function. Thus, such a reception apparatus is capable of substantially departing from a range of personal use, which is the original purpose of the copyright protection.

It is thus an object of the present invention to provide a content/information transmission apparatus, a content/information reception apparatus and a content/information transmission method, which are capable of implementing copy protection for avoiding an illegal operation to copy a content during a transmission of the content through a wire or radio LAN installed at a home and capable of limiting legal operations to watch a content and make copies of the content to a range of personal use of the content.

In order to solve the problems described above, according to an aspect of the present invention, there is provided a content transmission apparatus for transmitting a content by way of a network, comprising:

network communication process means for transmitting and receiving data by way of the network;

transmission-content generation means for supplying a content to be transmitted to a content reception apparatus, which is connected to the content transmission apparatus through the network, to the network communication process means;

authentication means for receiving an authentication request from the content reception apparatus to perform an authentication determination for the received authentication request and issuing own authentication request thereof to the content reception apparatus;

encryption means for generating a key based on information produced by the authentication means as a result of execution of an authentication process in the authentication means and encrypting the content to be transmitted to the content reception apparatus by using the key; and timer means (time measurement means) used for measuring a time interval between transmission of a predetermined command request to the content reception apparatus and reception of a response from the content reception apparatus for the transmission of the command request;

wherein, if the measurement value produced by the timer means exceeds a predetermined value at the timer means, transmission of the content to the content reception apparatus is not executed.

If the authentication means executes determination of authentication of the response accompanying said predetermined authentication information, wherein the predetermined command request in the above-stated content transmission apparatus is assumed to be a command request accompanying the predetermined authentication information, and the determination is not authorized, or if the measurement value exceeds the predetermined value in the timer means, the requested content is not transmitted to the content reception apparatus.

In addition, in the above-stated content transmission apparatus, when measurement of a time interval until a reception of the response from the content reception apparatus is executed two or more times and a value obtained as a result of predetermined statistical processing exceeds a predetermined value, the requested content is not transmitted to the content reception apparatus.

In order to solve the problems described above, according to another aspect of the present invention, there is provided a content reception apparatus for receiving a content by way of a network, comprising:

authentication means for receiving the authentication request to perform an authentication determination for the authentication request and issuing an authentication request to the content transmission apparatus;

decryption means for generating a key based on information produced by the authentication means as a result of execution of an authentication process in the authentication means and decrypting an encrypted content transmitted by the content transmission apparatus by using the key; and timer means used for measuring a time interval between transmission of a predetermined command request to the content transmission apparatus and reception a response transmitted by the content transmission apparatus to the transmission of the command request;

wherein, if the measurement value in the timer means exceeds a predetermined value, reception of the content to be transmitted from the content transmission apparatus is not executed.

That is to say, in accordance with the present invention, the content transmission apparatus and the content reception apparatus execute, prior to transmission of a content, determination of authentication information contained in a command request that accompanies predetermined authentication information, or determination of authentication based on a time interval until the reception of a response to a command request which accompanies predetermined authentication information. If the authentication is failed, transmission of the content to the content reception apparatus is not executed.

As a result, it is possible to implement copy protection for avoiding illegal copies of a content transmitted by way of a wire or radio LAN installed at a home. In addition, it is also possible to limit legal operations to watch a content and make copies of the content to a range of personal use of the content.

In accordance with the present invention, it is possible to improve the reliabilities of the content transmission apparatus, the content reception apparatus and the content transmission, which utilize a wire or radio LAN installed at a home.

DESCRIPTION OF THE PREFERRED EMBODIMENTS

Preferred embodiments of the present invention will be described below with reference to the drawings.

Embodiment 1

A first preferred embodiment of the present invention will be described below.

Figure 1:
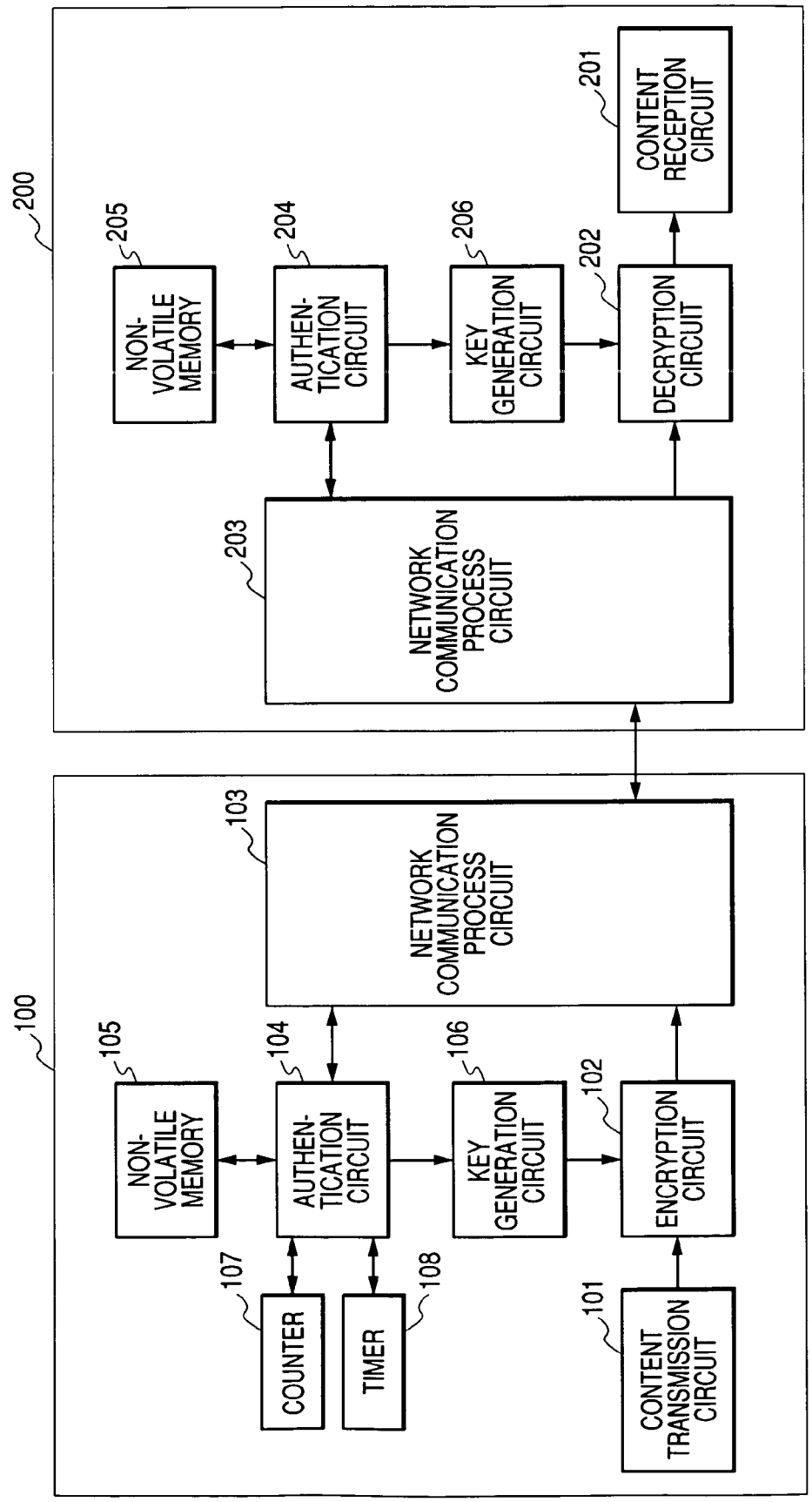
FIG. 1 is a block diagram showing a configuration of a content transmission apparatus and a content reception apparatus, which are implemented by a first preferred embodiment.

FIG. 1 is a diagram showing a configuration including a content transmission apparatus 100 and a content reception apparatus 200, which are implemented by the first embodiment of the present invention. In the configuration, the content transmission apparatus 100 and the content reception apparatus 200 are connected to each other by using a LAN.

The content transmission apparatus 100 comprises a content transmission circuit 101, an encryption circuit 102, a network-communication process circuit 103, an authentication circuit 104, a non-volatile memory 105, a key generation circuit 106, a counter circuit 107 and a timer circuit 108. The content transmission circuit 101 is a circuit for generating a content to be transmitted to the content reception apparatus 200. The encryption circuit 102 is a circuit for encrypting a content output by the content transmission circuit 101. The network-communication process circuit 103 is a circuit for transmitting a content encrypted by the encryption circuit 102 and an output of the authentication circuit 104 to another apparatus and receiving an input to the authentication circuit 104 from another apparatus by way of the LAN. The authentication circuit 104 is a circuit for exchanging information with another apparatus, which is connected to the LAN, to authenticate the other apparatus and request the other apparatus to authenticate the content transmission apparatus 100. The non-volatile memory 105 is a memory used for storing information necessary for processing carried out by the authentication circuit 104. The key generation circuit 106 is a circuit for generating a key based on information generated by the authentication circuit 104 as a key to be used by the encryption circuit 102 to encrypt a content. The counter circuit 107 is a circuit for measuring the number of successful mutual authentications in the authentication circuit 104 and storing the data. The timer circuit 108 is a circuit for measuring a time interval between a transmission of information such as an authentication request issued by the authentication circuit 104 to another apparatus and a reception of response information to the information from the other apparatus. The content transmitted from the content transmission circuit 101 is not limited to specific types of things, and image and voice data of a program received from a TV broadcasting service, image and voice data that are reproduced by a recording medium such as an HDD or DVD disk, a tape or the like may be applied, for example. In FIG. 1, a tuner for broadcast receiving, means for recording and reproducing, a data compression process circuit required prior to transmission by way of a network, etc. are omitted. Such means may be added as appropriate in the configuration depending on the type of content to be transmitted. An identification code is appended to a content transmitted by the content transmission circuit 101 to the content reception apparatus 200. The identification code appended to a content can be 'Copy free', 'Copy one generation', 'No more copies' or 'Copy never' indicating how to handle the content.

On the other hand, the content reception apparatus 200 comprises a content reception circuit 201, a decryption circuit 202, a network-communication process circuit 203, an authentication circuit 204, a non-volatile memory 205 and a key generation circuit 206. The content reception circuit 201 is a circuit for receiving a content transmitted by another apparatus by way of the LAN. The decryption circuit 202 is a circuit for finally receiving a content encrypted by the encryption circuit 102 employed in the content transmission apparatus 100 from the network-communication process circuit 203, decrypting the content and outputting the decrypted content to the content reception circuit 201. The network-communication process circuit 203 is a circuit for transmitting an output of the authentication circuit 204 to another apparatus and receiving an input to the authentication circuit 204 and a content supplied to the decryption circuit 202 from another apparatus by way of the LAN. The authentication circuit 204 is a circuit for exchanging information with another apparatus to authenticate the other apparatus and request the other apparatus to authenticate the content reception apparatus 200. The non-volatile memory 205 is a memory used for storing information necessary for processing carried out by the authentication circuit 204. The key generation circuit 206 is a circuit for generating a key based on information generated by the authentication circuit 204 as a key to be used by the decryption circuit 202 to decrypt a content. Image and voice data, which are outputs of the content reception circuit 201, are used in diversified manners such as being displayed by a display device or recorded on recording media such as a disk or a tape, and the type of usage according to the present invention is not limited to a specific thing. In FIG. 1, means for displaying or recording a content and means for expanding/decompressing a data-compressed content are omitted, and such means may be added as appropriate depending on the type of usage of the received content. It should be noted that a content received is processed according to an identification code of 'Copy free', 'Copy one generation', 'No more copies' or 'Copy never' that is transmitted along with the content. A content of the 'Copy free' or the 'Copy one generation' category can be recorded on a recording medium, and, when a content of the 'Copy one generation' category is recorded, the content is handled thereafter as a content of the 'No more copies' category.

Figure 2:
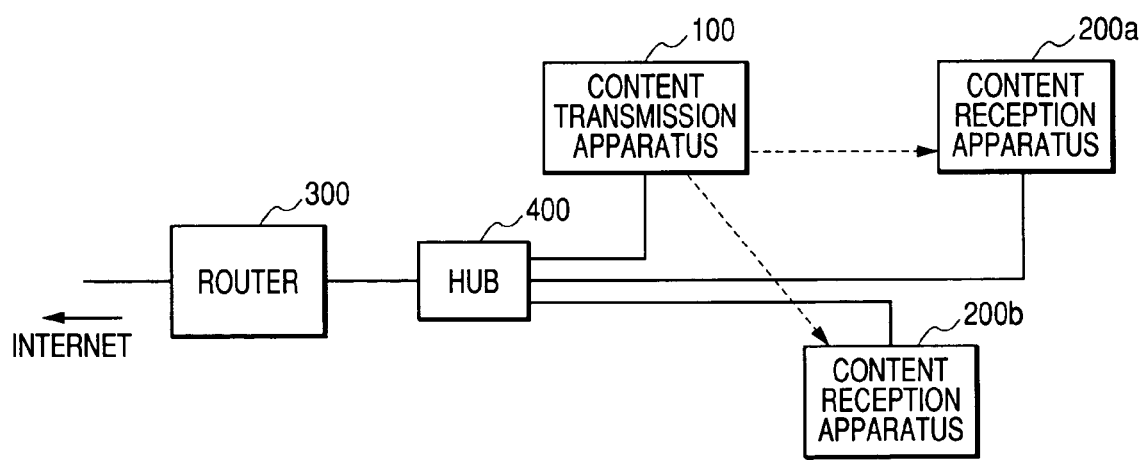
FIG. 2 is a block diagram showing a LAN configured with the content transmission apparatus and the content reception apparatus which are implemented by the first embodiment.

FIG. 2 is a block diagram showing an example of a LAN configured with a content transmission apparatus 100 and a content reception apparatus 200. More specifically, the content transmission apparatus 100 and the two content reception apparatus 200a and 200b are respectively connected to a hub 400 by cables of a wire LAN. The hub 400 is further connected to a router 300, which is connected to the Internet through a device that is not shown in the diagram such as a modem or an opto-electrical converter, or a modem or an opto-electrical converter built in the router. The connection to the Internet includes any type of technology, for example, a high-speed access line such as an Asymmetric Digital Subscriber Line (ADSL) and a fiber-optic line, an Integrated Services Digital Network (ISDN), an analog telephone line, and a mobile communication network such as a mobile phone. The dotted line in FIG. 2 indicates apparatuses among which a content is transmitted and received as well as directions of the transmission and the reception.

The configuration of LAN shown in FIG. 2 only shows an example, and three or more content reception apparatuses 200 may be connected. In addition, two or more content transmission apparatus may be connected, and in this case, it is possible to transmit different contents simultaneously from a content transmission apparatus to content reception apparatuses so far as the bandwidth of the LAN permits. It should be noted that the minimum required configuration for the present invention is that one each content transmission apparatus and content reception apparatus is connected to a LAN.

In the LAN shown in FIG. 2, the standard Internet Protocol (IP) is used for a network protocol, and the Transmission Control Protocol (TCP) and the User Datagram Protocol (UDP) are used for high-order protocols. For transmission of a content, a higher-order application protocol such as the Real-time Transport Protocol (RTP) or the Hyper Text Transfer Protocol (HTTP) is used. It should be noted that there are different versions IPv4 and IPv6 for the IP, but the present invention is not limited to either of such versions.

The content transmission apparatus 100, the content reception apparatuses 200a and 200b as well as the router 300 each have an IP address for identifying the owner of the address as an apparatus existing on the LAN. In addition, a Media Access Control (MAC) address having a length of 48 bits is assigned in advance to an interface unit of each of the network-communication process circuit 103 and the network-communication process circuit 203 at a manufacturing time. The IP addresses are set in the content transmission apparatus 100, the content reception apparatuses 200a and 200b as well as the router 300 in accordance with a DHCP widely adopted as a conventional protocol for automatically setting addresses in a network. In accordance with the DHCP, typically, the router 300 is operated as a DHCP server, which then assigns IP addresses to the other apparatuses. It is to be noted that, if an IPv6 is used, in accordance with a method known as a stateless automatic setting technique, an IP address assigned to another apparatus consists of the 64 high-order bits of an IP address assigned to the router 300 and a MAC address set in the other apparatus.

Figure 3:
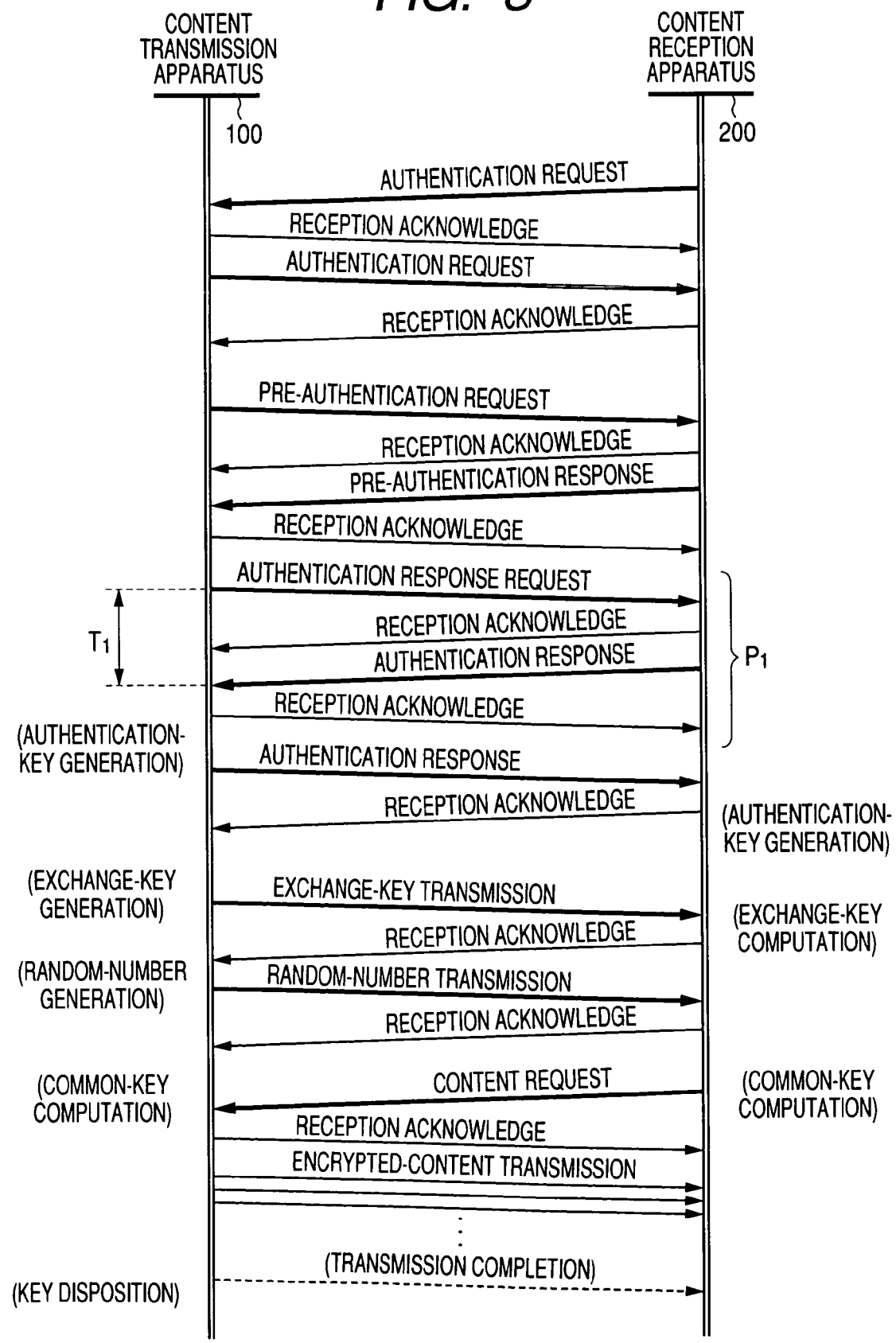
FIG. 3 is a sequence diagram showing procedures for transmitting a content between the content transmission apparatus and the content reception apparatus which are implemented by the first embodiment.

FIG. 3 is a diagram showing a typical procedure for transmitting a content from the content transmission apparatus 100 to the content reception apparatus 200. A vertical line at the left end represents the content transmission apparatus 100 whereas a vertical line at the right end represents the content reception apparatus 200. Arrows each represent the timing and direction of a transmission or reception of the apparatuses.

Prior to transmission of a content, the content transmission apparatus 100 and the content reception apparatus 200 mutually authenticate apparatus thereof, and implement transmission of the content after verifying that the apparatus of the other party is fairly manufactured pursuant to copyright protection regulations. A TCP is used as a communication protocol for transmitting and receiving authentication information. When various information such as an authentication request to the apparatus of the other party and an authentication response thereto is transmitted, a reception acknowledgment is returned by the apparatus of the other party, and thus a communication path which enables detection of a transmission error is secured. It should be noted that, in FIG. 3, transmission and reception of data for establishing and deleting a connection by using a TCP are omitted.

First of all, the content reception apparatus 200 creates an authentication request. The authentication request specifies a public key serving as the apparatus-unique information and a certificate of the public key, which are created by a specific authentication agency and stored in the non-volatile memory 205 of the content reception apparatus 200. The authentication request is then transmitted to the content transmission apparatus 100. The public key and the certificate are pre-stored in the non-volatile memory 205 at a manufacturing time of the content reception apparatus 200. Receiving the authentication request, the content transmission apparatus 100 transmits an acknowledgement of the reception of the authentication request to the content reception apparatus 200. Then, the content transmission apparatus 100 creates its own authentication request for authenticating the content reception apparatus 200. Much like the authentication request created by the content reception apparatus 200, the authentication request created by the content transmission apparatus 100 specifies a public key unique to the content transmission apparatus 100 and a certificate of the public key issued by an authentication agency. The content transmission apparatus 100 then transmits the authentication request to the content reception apparatus 200.

In the meantime, the content transmission apparatus 100 authenticates the content reception apparatus 200 based on a predetermined public key signature algorithm. Upon confirming the correctness of the content reception apparatus 200 with the public key signature algorithm, the content transmission apparatus 100 transmits a request for pre-authentication response to the content reception apparatus 200, and waits for transmission of a pre-authentication response to the request.

Likewise, the content reception apparatus 200 receives an authentication request from the content transmission apparatus 100, authenticates the content transmission apparatus 100 based on the public key signature algorithm and waits for transmission of a pre-authentication response request to be made by the content transmission apparatus 100. Upon receiving the pre-authentication response request, the content reception apparatus 200 sends a pre-authentication response to the content transmission apparatus 100 when a process to confirm correctness of the content transmission apparatus 100 is finished and an authentication response is ready to be issued.

The content transmission apparatus 100, upon receiving the pre-authentication response, sends an authentication response request to the content reception apparatus 200 to drive the timer circuit 108 to start its operation. In addition, it then measures a time interval T1 between the transmission of the authentication response to be transmitted by the content reception apparatus 200 responding to the authentication response request and a reception of the response. If the time interval T1 exceeds a predetermined value, the authentication is determined to be unsuccessful. It is likely that the time interval T1 temporally may exceed the predetermined value when a network status has a significant impact causing a large network load, etc. Considering such situation, a successful authentication may be judged by executing a time measuring process P1 a plurality of times and, for example, calculating T1 by way of a statistical process like obtaining an average by cutting off the maximum and minimum values.

Further, the content transmission apparatus 100 checks a value of the counter 107. If the current reading exceeds a predetermined value, the content transmission apparatus 100 determines the authentication to be unsuccessful, and increase the reading of the counter 107 just by one increment when the authentication is successful. When the authentication is successful, the content transmission apparatus 100 issues an authentication response and transmits the response to the content reception apparatus 200.

If the mutual authentications described above are successful, an authentication key common to the content transmission apparatus 100 and the content reception apparatus 200 is generated as a key to be shared by the apparatuses. A commonly known key exchange algorithm such as the Diffie-Hellman key agreement protocol is normally adopted in generating the authentication key.

When the process of sharing the authentication key is completed, the content transmission apparatus 100 generates an exchange key and a random number, encrypts the exchange key and the random number by using the authentication key and transmits the encrypted exchange key and the encrypted random number to the content reception apparatus 200. Incidentally, the content transmission apparatus 100 transmits the encrypted exchange key and the encrypted random number to the content reception apparatus 200 separately in accordance with the procedure shown in FIG. 3. The content transmission apparatus 100 may however transmit the encrypted exchange key and the encrypted random number to the content reception apparatus 200 as single data. Then, the content reception apparatus 200 uses the authentication key to decrypt the encrypted exchange key and the encrypted random number, which have been received from the content transmission apparatus 100, and stores the exchange key and the random number in a memory. Subsequently, the content transmission apparatus 100 and the content reception apparatus 200 each use the exchange key and the random number to generate a common key in accordance with a computation algorithm determined in advance. With such common key generated, it is possible to encrypt a content and transmit the content by the content transmission apparatus 100 to the content reception apparatus 200, thus enabling reception of decrypted content by the content reception apparatus 200.

Actually, to start the transmission operation of a content, a content transmission request is sent from the content reception apparatus 200, as shown in FIG. 3, and transmission of the content is implemented as being triggered by the request. When the transmission of content is completed, the content transmission apparatus 100 may notify the transmission of completion, or the content reception apparatus 200 may request for a transmission completion notice, vice versa. In addition, when data amount of a content is known beforehand, it is not necessary in particular for either of the content transmission apparatus 100 or the content reception apparatus 200 to notify transmission completion or request for a notice thereof. After the completion of transmission of all necessary contents, the content transmission apparatus 100 destroys the authentication key, the exchange key, the random number and the common key. Likewise, the content reception apparatus 200 may destroy the authorization key, the exchange key, the random number and the common key upon completion of reception of a content and a new reception of the content is performed based on the authorization request when the reception of the content is executed again. However, if the content transmission apparatus 100 has already transmitted a content to another content reception apparatus and a previous key can be used again, the previous key can be reused after inquiring information on the present key to the content transmission apparatus 100 from the other content reception apparatus 200.

The protocol adopted in transmitting a content from the content transmission apparatus 100 to the content reception apparatus 200 is not limited to the specific one. Protocols adoptable in such transmission include a Real-Time Transport Protocol (RTP), a Hyper Text Transfer Protocol (HTTP) and a File Transfer Protocol (FTP) as stated earlier. In a transmission of a content, the content is encrypted by using a common key in accordance with an encryption algorithm determined in advance and accommodated in a payload portion of a transfer protocol used in the transmission. An Advanced Encryption Standard (AES) algorithm can be adopted as a typical encryption algorithm.

As described above, since a content that is encrypted by use of a common encryption key between the content transmission apparatus 100 and the content reception apparatus 200 shown in FIG. 1 is transmitted and received, correct decryption cannot be achieved even if the content is received by another apparatus on a LAN, thus enabling to prevent the content from being illegally copied by a user.

As shown in FIG. 2, it is also possible to receive a content simultaneously by two or more content reception apparatuses. In this case, the content is transmitted after a mutual authentication is implemented in accordance with procedures shown in FIG. 3 between each of the content reception apparatuses and the content transmission apparatus. At this time, the number of content reception apparatuses that are authenticated by a content transmission apparatus is counted by the counter 107. Therefore, by determining the upper limit of the number of content reception apparatuses to be authorized by the content transmission apparatus, it is possible to restrict the number of duplicated contents that can be created by simultaneously using a plurality of content reception apparatuses. The upper limit of the number of content reception apparatuses can be 62 which is the upper limit number of content reception apparatuses that can be connected at a time, for example, by using an IEEE 1394 serial bus or a smaller number thereof.

In addition, for a case where the content reception apparatus 200 is installed in a house other than the house of a user by way of the Internet, restriction is provided based on the measurement result of the time interval T1 that is measured with the time measuring process P1 as shown in FIG. 3. Longer time is required before receipt of a response than the time required for transmitting and receiving the content in a house since the content is transmitted and received by way of a wide-area network and the router 300. To solve the problem, if the upper limit value for determining successful authentication is fixed to an adequate value, e.g., 10 milliseconds, it is possible to limit the transmittable range of a content within the house of a user.

Further, for measurement of the time interval T1, by measuring the time of the process P1 as a series of authentication procedures, and not by measuring a response time required between transmission of data of TCP used as a communication protocol and return of reception acknowledgment thereof, it is possible to prevent another apparatus from spoofing to the content reception apparatus 200. Furthermore, a procedure to transmit a pre-command is added as a preparatory measure for measuring time in the process P1. Provision of the procedures prevents any impact of the measured time on the time measurement result. Therefore, it is possible to realize time measuring that does not depend on the computation capability of an apparatus.

Embodiment 2

A second preferred embodiment of the present invention is explained below.

In the second embodiment, a content transmission apparatus 100 and a content reception apparatus 200 are configured in the same way as shown in FIG. 1.

Figure 4:
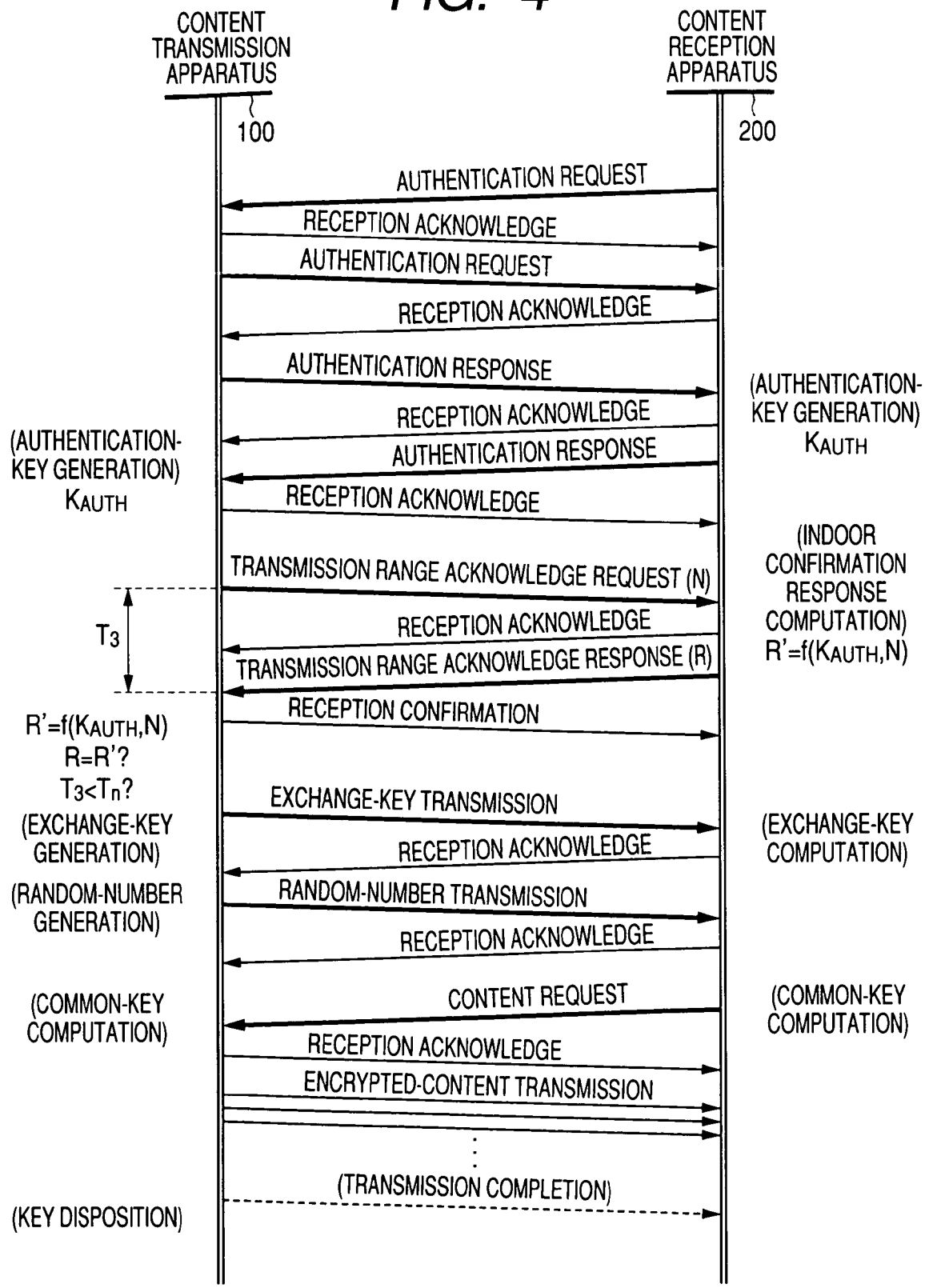
FIG. 4 is a sequence diagram showing procedures for transmitting a content between a content transmission apparatus and a content reception apparatus which are implemented by a second preferred embodiment.

FIG. 4 is a diagram showing a typical procedure for transmitting a content from the content transmission apparatus 100 to the content reception apparatus 200. As is similar to FIG. 3, a vertical line at the left end represents the content transmission apparatus 100 whereas a vertical line at the right end represents the content reception apparatus 200. Arrows each represent the timing and direction of a transmission or reception of the apparatuses. Basic processing procedures are the same as those shown in FIG. 3 for the first embodiment, but, the procedure shown in FIG. 4 differs in a point that an authorization key is shared as a result of an authorization process between the content transmission apparatus 100 and the content reception apparatus 200, and then a transmission range acknowledgment process is securely executed by using the authorization key. First of all, an authorization process is executed.

The content reception apparatus 200 creates an authentication request in the similar procedures as shown in FIG. 3. The authentication request is then transmitted to the content transmission apparatus 100 along with a public key serving as the apparatus-unique information and a certificate of the public key.

Receiving the authentication request, the content transmission apparatus 100 transmits an acknowledgement of the reception of the authentication request to the content reception apparatus 200. Then, the content transmission apparatus 100 creates its own authentication request for authenticating the content reception apparatus 200 and sends the authentication request along with a public key serving as the apparatus-unique information and a certificate of the public key to the content reception apparatus 200.

In the meantime, the content transmission apparatus 100 authenticates the content reception apparatus 200 based on a predetermined public key signature algorithm. When the authorization is successful, the content transmission apparatus 100 issues an authorization response and transmits the response to the content reception apparatus 200.

Likewise, the content reception apparatus 200 also executes authorization after receiving an authorization request from the content transmission apparatus 100, and when the authorization is successful, the content reception apparatus 200 issues an authorization response and transmits the response to the content transmission apparatus 100.

If the mutual authentications described above are successful, an authentication key common to the content transmission apparatus 100 and the content reception apparatus 200 is generated as a key to be shared by the apparatuses.

When the mutual authentication process is successful, a transmission range acknowledgment process is then implemented.

First, the content transmission apparatus 100 creates a transmission range acknowledgment request. The content transmission apparatus 100 adds a voluntary value N that is generated by an internal process to the request and sends the request to the content reception apparatus 200. The operation of the timer circuit 108 is started to acknowledge the transmission range, thereby implementing measurement of a time interval T3 until a transmission range acknowledgment response is received from the content reception apparatus 200.

Upon receiving the transmission range acknowledgment request, the content reception apparatus 200 uses an authorization key KAUTH that is shared in the above-described mutual authentication process to generates transmission range acknowledgment response data R in the manner like R=f (KAUTH, N) by use of an encryption algorithm that is agreed in the transmission range acknowledgment process. The content reception apparatus 200 then transmits the transmission range acknowledgment response to the content transmission apparatus 100 along with the data R.

Meanwhile, the content transmission apparatus 100 computes data R' in the similar procedure. The content transmission apparatus 100 compares the response data R with the data R' obtained by its own computation. If the data R and the data R' are equivalent to each other, the content transmission apparatus 100 then determines that the transmission range acknowledgment response is transmitted by the content reception apparatus 200 that is an apparatus mutually authenticated. Further, the content transmission apparatus 100 determines whether the content reception apparatus 200 is within a transmittable range based on whether or not the time interval T3 until receipt of the transmission range acknowledgment response from the content reception apparatus 200 exceeds a predetermined value Tn. More specifically, if the conditions R=R' and T3<Tn are satisfied, the transmission range acknowledgment process is determined to be successful.

It is to be noted that, to suppress an impact of different computation capabilities among apparatuses on measurement results, the above stated procedures shall adopt an encryption algorithm having a low computation load such as Secure Hash Algorithm, revision 1 (SHA-1) or Advanced Encryption Standard (AES). In addition, the SHA-1 or the AES is preferable in that they are not required to be additionally mounted since they are already mounted in DTCP-ready apparatuses.

Further, even for a case where, as is the case for the first embodiment, reading of the counter 107 reveals that the current reading exceeds a predetermined value, the acknowledgment process of transmittable range is determined to be unsuccessful. In addition, if the acknowledgment process of the transmittable range is successful, the reading of the counter 107 is increased by one increment.

Since the key exchange process for content transmission after completion of the acknowledgment process of transmittable range is the same as the first embodiment, the process will be omitted here.

As stated above, the second embodiment can obtain an effect similar to that of the first embodiment. Further, since it is possible to acknowledge the transmission source of a transmission range acknowledgment response, it is possible to execute a transmission acknowledgment process more securely than the first embodiment, thus enabling to prevent another apparatus from spoofing to the content reception apparatus 200.

Embodiment 3

A third preferred embodiment of the present invention is described below.

Figure 5:
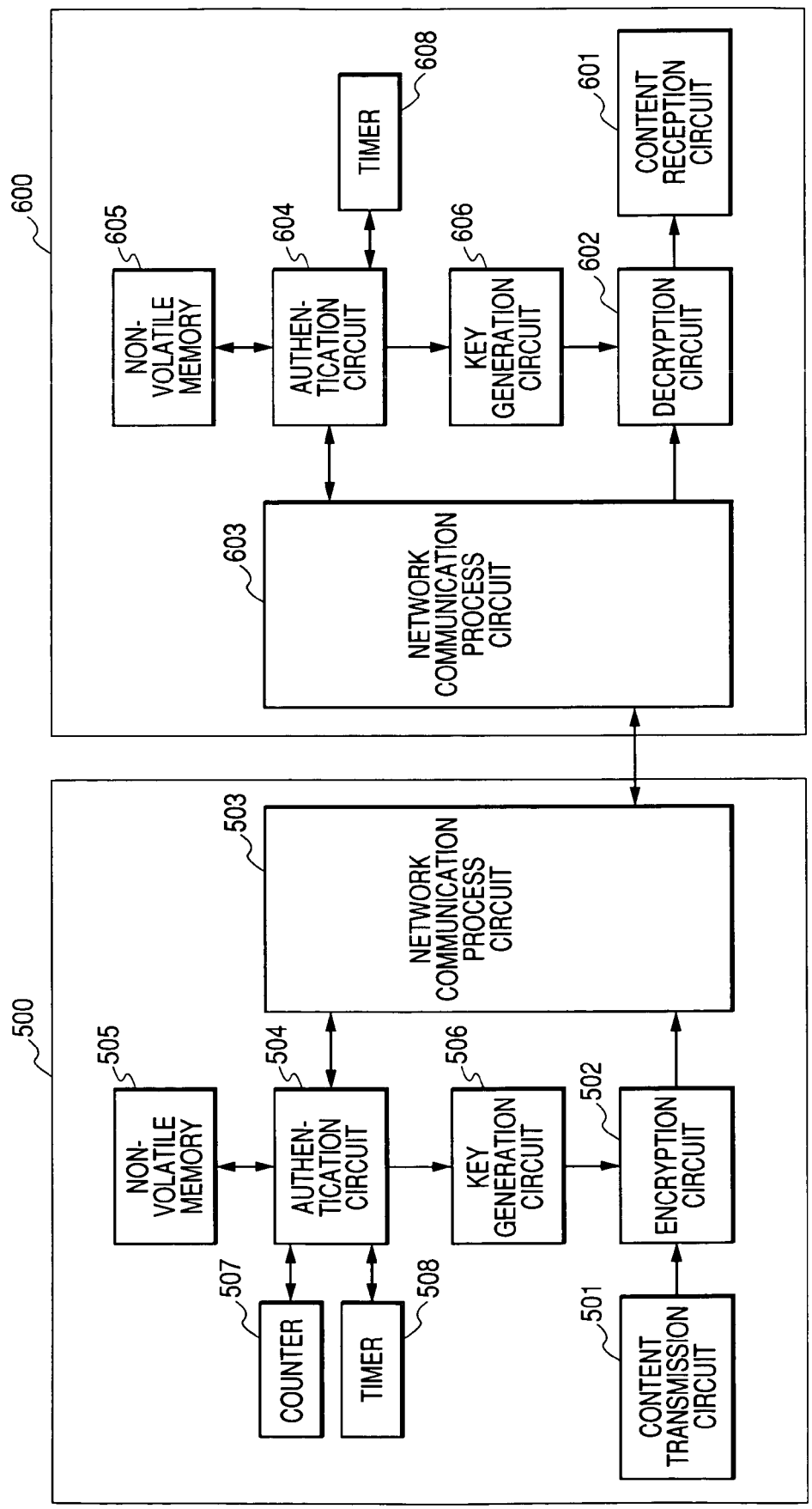
FIG. 5 is a block diagram showing a LAN configured with the content transmission apparatus and the content reception apparatus which are implemented by a third preferred embodiment.

FIG. 5 is a diagram showing a configuration of a content transmission apparatus 500 and a content reception apparatus 600 according to the third embodiment. The content transmission apparatus 500 and the content reception apparatus 600 shown in FIG. 5 differ from the content transmission apparatus 100 and the content reception apparatus 200 shown in FIG. 1 in that a timer circuit 608 which measures a time interval from a transmission of information such as an authentication request issued by an authorization circuit 604 to reception of response information to the above-stated information is provided also in the content reception apparatus 600.

Figure 6:
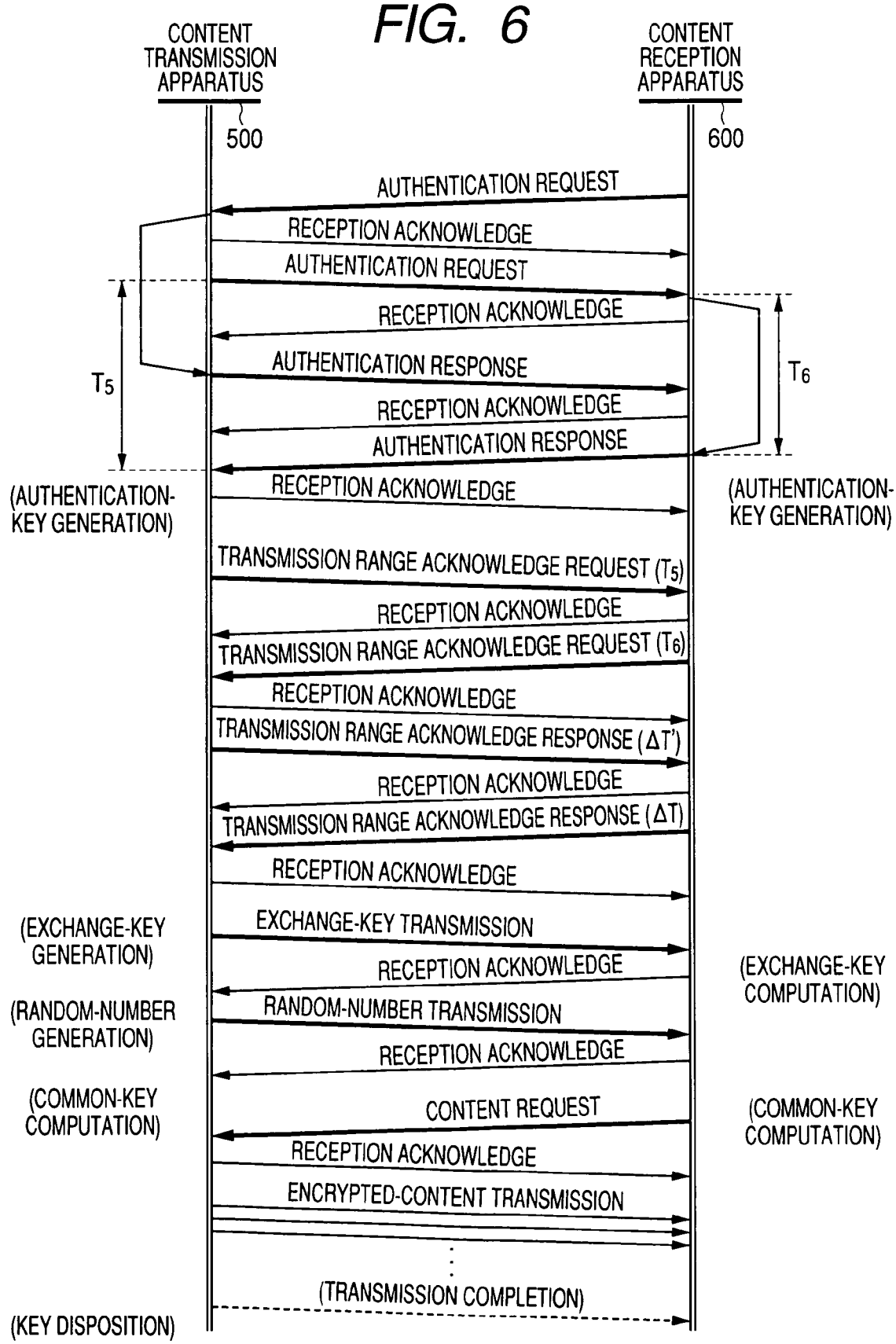
FIG. 6 is a sequence diagram showing procedures for transmitting a content between a content transmission apparatus and a content reception apparatus which are implemented by the third embodiment.

FIG. 6 is a diagram showing a typical procedure for transmitting a content from the content transmission apparatus 500 to the content reception apparatus 600. As is similar to FIG. 3, a vertical line at the left end represents the content transmission apparatus 500 whereas a vertical line at the right end represents the content reception apparatus 600. Arrows each represent the timing and direction of a transmission or reception of the apparatus. Basic processing procedures are the same as those shown in FIG. 4 for the second embodiment. However, the procedure shown in FIG. 6 differs in a point that time measuring operation for acknowledging a transmission range is executed during an authentication process both at the content transmission apparatus 500 and the content reception apparatus 600. In addition it differs in a point that a successful transmission range acknowledgment process is determined based on the result of the time measuring operation performed by both the content transmission apparatus 500 and the content reception apparatus 600.

First of all, an authorization process is executed. The content reception apparatus 600 creates an authentication request in the similar procedures as shown in FIG. 3. The authentication request is then transmitted to the content transmission apparatus 500 along with a public key serving as the apparatus-unique information and a certificate of the public key.

Receiving the authentication request, the content transmission apparatus 500 transmits acknowledgement of the reception of the authentication request to the content reception apparatus 600. Then, the content transmission apparatus 500 creates its own authentication request for authenticating the content reception apparatus 600 and sends the authentication request along with a public key serving as the apparatus-unique information and a certificate of the public key to the content reception apparatus 600. Then, the operation of a timer circuit 508 is started to implement measurement of a time interval T5 until receipt of an authentication response from the content reception apparatus 600.

In the meantime, the content transmission apparatus 500 authenticates the content reception apparatus 600 based on a predetermined public key signature algorithm. When the authorization is successful, the content transmission apparatus 500 issues an authorization response and transmits the response to the content reception apparatus 600.

The content reception apparatus 600, upon receiving the authentication request from the content transmission apparatus 600, starts the operation of the timer circuit 608, executes a process to authenticate the content transmission apparatus 500. If the authentication is successful, measurement of a time interval T6 between generation of an authentication response and transmission of the response is started.

If the mutual authentications described above are successful, an authentication key common to the content transmission apparatus 500 and the content reception apparatus 600 is generated as a key to be shared by the apparatuses. Further, the content transmission apparatus 500 has acquired a measuring result of the time interval T5 between transmission of the authentication request and reception of the authentication response from the content reception apparatus 600, while the content reception apparatus 600 has acquired a measuring result of the time interval T6 between reception of the authentication request from the content transmission apparatus 500 and transmission of the authentication response to the content transmission apparatus 500.

When the mutual authentication process is successful, a transmission range acknowledgment process is then implemented.

First, the content transmission apparatus 500 creates a transmission range acknowledgment request and transmits the request to the content reception apparatus 600 with the time interval T5 measured in the mutual authentication process.

In addition, the content reception apparatus 600 also creates a transmission range acknowledgment request and transmits the request to the content transmission apparatus 500 with the time interval T6, thus enabling mutual exchange of time interval data.

Next, as a real transmission time, a computation $\Delta T=T5-T6$ ($\Delta T'=T5-T6$) is mutually executed and encrypted by using an authorization key, and the result is exchanged as transmission range acknowledgment responses.

Meanwhile, the content transmission apparatus 500 compares the real transmission time $\Delta T'$ obtained by its own computation with $\Delta T$ obtained from the content reception apparatus 600. If the data $\Delta T'$ and the data $\Delta T$ are equivalent to each other, the content transmission apparatus 500 then determines that the transmission range acknowledgment response is transmitted by the content reception apparatus 600. Further, the content transmission apparatus 500 determines whether the content reception apparatus 600 is within a transmittable range based on whether or not the real transmission time $\Delta T'$ exceeds a predetermined value Tn. More specifically, if the conditions, $\Delta T=\Delta T'$ and $\Delta T'<Tn$, are satisfied, the transmission range acknowledgment process at the content transmission apparatus 500 is determined to be successful.

The content reception apparatus 600 executes a similar process. If the real transmission time $\Delta$ obtained from the content transmission apparatus 500 is equivalent to $\Delta$ obtained by its own computation, and the condition $\Delta<Tn$ is satisfied, the transmission range acknowledgment process is determined to be successful.

It is to be noted that, since a process of the content transmission apparatus 500 to check readings of a counter 507 and a key exchange process after completion of the acknowledgment process of a transmittable range is the same as those of the first embodiment, the processes will be omitted here.

As is obvious from the above explanation, in the third embodiment, it is possible to obtain an effect similar to that of the first embodiment. Further, since it is possible to acknowledge the transmission source of a transmission range acknowledgment response at both the content transmission apparatus and the content reception apparatus, it is possible to execute a transmission acknowledgment process more securely than the second embodiment. Since also the content reception apparatus 600 executes the transmission range acknowledgment process, it can refuse to receive a content that exceeds the transmittable range.

Embodiment 4

A fourth preferred embodiment of the present invention is described below.

Figure 7:
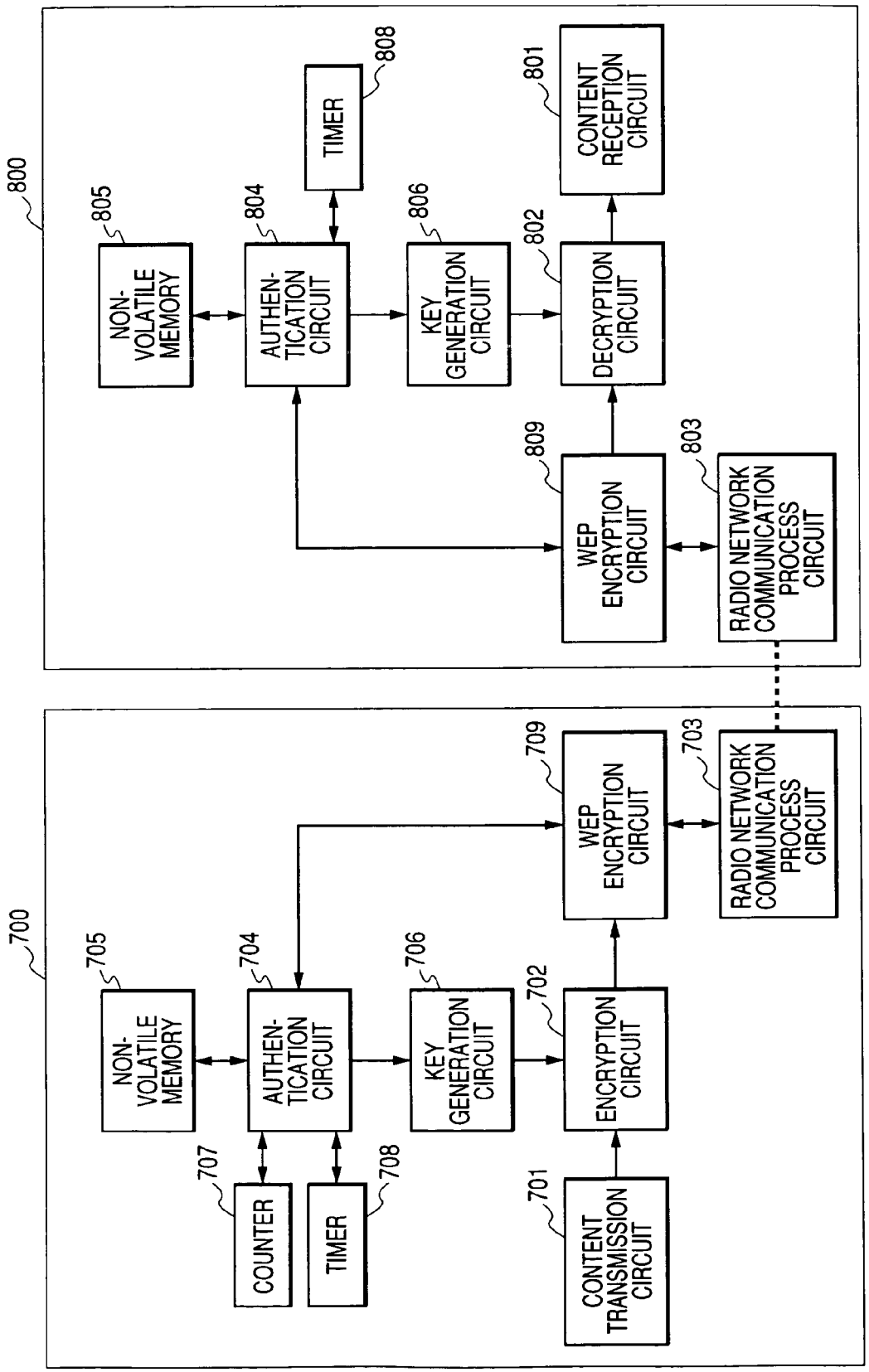
FIG. 7 is a block diagram showing a LAN configured with a content transmission apparatus and a content reception apparatus which are implemented by a fourth preferred embodiment.

FIG. 7 is a diagram showing a configuration of a content transmission apparatus 700 and a content reception apparatus 800 according to the fourth embodiment. The content transmission apparatus 700 and the content reception apparatus 800 shown in FIG. 7 differ from the content transmission apparatus 500 and the content reception apparatus 600 shown in FIG. 5 in that a content is transmitted by using a radio LAN, and in that radio network communication process circuits 703 and 803 are used for a connection with the LAN, and Wired Equivalent Privacy (WEP) encryption circuits 709 and 809 are provided. A WEP technique is an encryption method commonly known as an industry standard set for the purpose of security protection in a radio LAN. The WEP method allows communications with security protection to be implemented between reception and transmission apparatus under management executed by the user.

Figure 8:
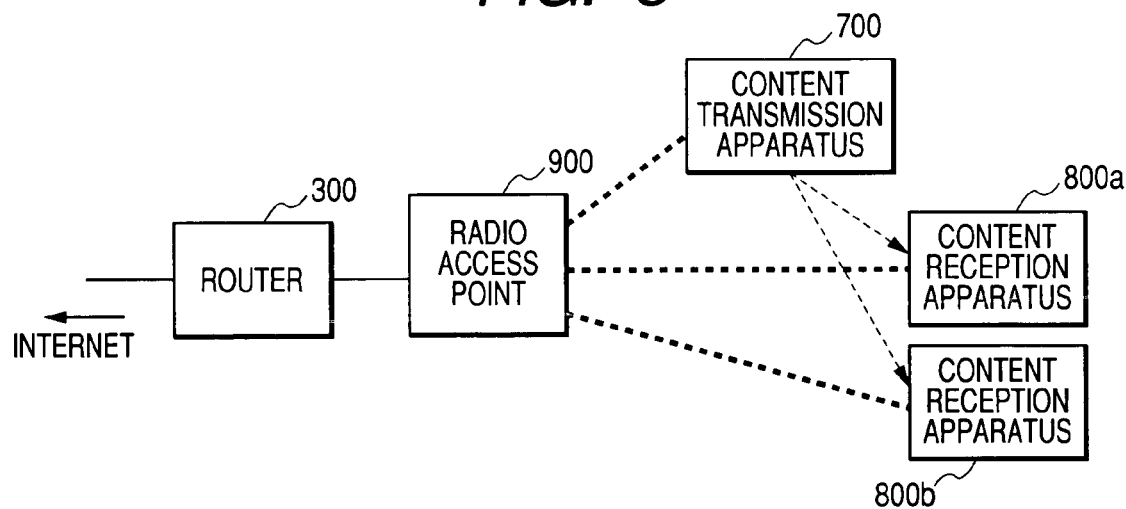
FIG. 8 is a block diagram showing another LAN configured with a content transmission apparatus and a content reception apparatus which are implemented by the fourth preferred embodiment.

FIG. 8 is a diagram showing the configuration of a network installed inside a home as a network for connecting the content transmission apparatus 700 with content reception apparatus 800. In the configuration shown in FIG. 8, the content transmission apparatus 700 is connected to two content reception apparatuses, namely, the content reception apparatus 800a and the content reception apparatus 800b through the radio LAN at a radio access point 900, which is further connected to a router 300. Much like the router 300 shown in FIG. 2, this router 300 is connected to the Internet.

Mutual authentications between the content transmission apparatus 700 and the content reception apparatus 800 shown in FIG. 7 are carried out, and then a content is transmitted from the content transmission apparatus 700 to the content reception apparatus 800. In this case, authentication circuits 704 and 804 check whether or not WEP processing has been carried out in the WEP encryption circuit 709 and the WEP encryption circuit 809 respectively. If no WEP processing has been carried out, a process is carried out in order to prevent the mutual authentications and the subsequent processing to transmit a content from being performed or in order to typically display a message requesting the user to activate the WEP processing. As described above, before a content is transmitted through the radio LAN, the WEP processing is always carried out. As a result, it is possible to prevent a content from being illegally copied by another data reception apparatus, which is connected to the radio LAN without awareness of the users of the content transmission apparatus 700 and the content reception apparatus 800.

Aspects other than what is described above are exactly the same as those of the content transmission methods adopted by the content transmission apparatus and the content reception apparatus, which are implemented by the third embodiments shown in FIGS. 5 to 7. Thus, it is possible to protect copyrights of contents by preventing creations of illegal copies of the contents. As a result, it is possible to prevent a content from being transmitted beyond a range of personal use. It is to be noted that the description is made in the same method as the third embodiment. However, if authentication procedures are executed with the same circuit configuration as shown for the first and second embodiments except the configuration related to the radio LAN, it is possible to obtain an effect similar to that of the first and second embodiments.

Figure 9:
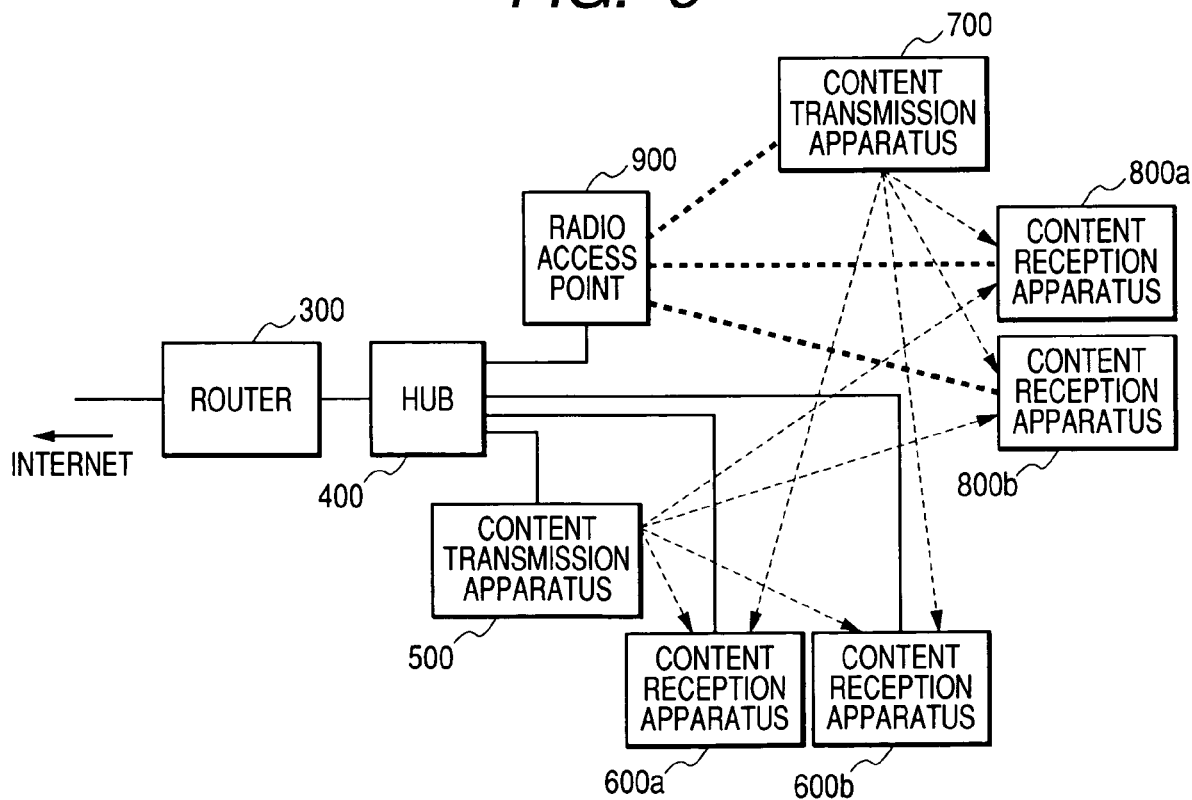
FIG. 9 is a block diagram showing a LAN configured with a content transmission apparatus and a content reception apparatus which are implemented by the third and fourth embodiments.

In the embodiments according to the present invention described above, the use of a wire LAN and the use of a radio LAN are described independently. However, it is possible to build an in-house LAN by simultaneously using the two types of LANs, to which case the present invention can also be applied. FIG. 9 shows a configuration wherein a content transmission apparatus and a content reception apparatus according to embodiments of the present invention are used for a LAN configured by use of a wire and a radio LAN.

In FIG. 9, a content transmission apparatus 500, a content reception apparatus 600a and a content reception apparatus 600b are connected to each other by way of a network hub 400, to which a radio access point 900 is also connected. A content transmission apparatus 700 and content reception apparatuses 800a and 800b are connected to the radio access point 900 by way of a radio LAN. Further, the network hub 400 is connected to the router 300. With such arrangement, the in-house LAN is connected to the Internet.

Thin dotted lines with an arrow shown in FIG. 9 each indicate a transmission direction of a content. Content transmission apparatuses and the content reception apparatuses can transmit a content therebetween without awareness that other parties are connected by way of a wire LAN or a radio LAN. The transmission procedures in this case can be the same procedures as described by using FIG. 9. In addition, the content transmission apparatus 700 using a wire LAN and the content reception apparatuses 800a and 800b can be arranged to execute mutual authentication and transmission of a content after checking of operations of WEP in the similar way as described earlier. Also in this case, it is possible to prevent creations of illegal copies when a content is transmitted as is the case with the independent wire and radio LAN configuration. In addition, it is possible to limit the content transmission within the range of a personal use.

In the above descriptions, information transmitted through the network is a content such as image information and apparatus transmitting and receiving the content are a content transmission apparatus and a content reception apparatus respectively. However, the present invention can of course be applied to information of a kind other than the image information and information-processing apparatus for outputting and inputting the information.

An authentication circuit, a key generation circuit, an encryption circuit, a decryption circuit, a counter circuit, a timer circuit, etc. in the embodiments of the present invention described above are not limited to realization thereof by using hardware. However, a part or all of such circuits may be realized by a microprocessor and software processes that are executed on the microprocessor, and, even in this case, there is no difference in obtaining effects of the present invention.

It is to be noted that, as a matter of explanatory convenience, a content transmission apparatus and a content reception apparatus are handled independently. However, in an apparatus that records and reproduces a content on or from a recording medium such as a disk or a tape, it may be arranged to have a configuration combining a content transmission apparatus and a content reception apparatus. In this case, an authentication circuit, a non-volatile memory, etc. can be shared by the content transmission apparatus and the content reception apparatus.

The present invention is effectively applicable to a system that distributes or receives a copyright-protected content by using a wire LAN or a radio LAN, wherein a range of the distribution is limited within a house.

What is claimed is:

1. A content transmission apparatus comprising:
an authenticator adapted 1) to perform an authentication for a content reception apparatus, and 2) to share an authentication key with said content reception apparatus when said authentication becomes successful, and 3) to send a request for transmission range acknowledgement and authentication information to said content reception apparatus, and 4) to receive a response transmitted from said content reception apparatus responding to said request for transmission range acknowledgement, and 5) to share an exchange key with said content reception apparatus;
an encryptor adapted to encrypt a content to be transmitted to said content reception apparatus based on said exchange key; and
a timer used for measuring a time interval between transmission of a said request for transmission range acknowledgement to said content reception apparatus and reception of said response transmitted from said content reception apparatus responding to the transmission of said request for transmission range acknowledgement;
wherein, said authenticator instructs said timer to measure said time interval between said transmission of said request and said reception of said response, and if a measurement value of said time interval exceeds a predetermined value, said authenticator does not share said exchange key with said content reception apparatus so that a range of the distribution of said content is limited within a house; and
wherein, said response of said request for transmission range acknowledgement from said content reception apparatus includes a data generated based on said authentication information and said authentication key, and if said data is incorrect, said authenticator does not share said exchange key with said content reception apparatus.

2. The content transmission apparatus according to claim 1, wherein said authenticator instructs said timer to measure two or more times said time interval between transmission of a said request and reception of said response, and if a measurement value obtained as a result of predetermined statistical processing exceeds a predetermined value, said authenticator does not share said exchange key with said content reception apparatus.

3. A content reception apparatus comprising:
a content-receptor adapted to receive a content transmitted by a content transmission apparatus, which is connected to said content-receptor through said network;
an authenticator adapted 1) to perform an authentication for said content transmission apparatus, and 2) to share an authentication key with said content transmission apparatus when said authentication becomes successful, and 3) to send a request for transmission range acknowledgement and authentication information to said content transmission apparatus, and 4) to receive a response transmitted from said content transmission apparatus responding to said request for transmission range acknowledgement, and 5) to share an exchange key with said content transmission apparatus; and
a decryptor adapted to generate a key based on said exchange key produced by said authenticator as a result of execution of an authentication process in said authenticator, and to decrypt a content transmitted by said content transmission apparatus by using said key;
a timer used for measuring a time interval between transmission of a said request for transmission range acknowledgement to said content transmission apparatus and reception of a said response transmitted from said request for content transmission apparatus responding to the transmission of said request for transmission range acknowledgement;
wherein, said authenticator instructs said timer to measure said time interval between said transmission of said request and said reception of said response, and if a measurement value of said time interval exceeds a predetermined value, said authenticator does not share said exchange key with said content transmission apparatus so that a range of the distribution of said content is limited within a house; and
wherein, said response of said request for transmission range acknowledgement from said content transmission apparatus includes a data generated based on said authentication information and said authentication key, and if said data is incorrect, said authenticator does not share said exchange key with said content transmission apparatus.

4. The content reception apparatus according to claim 3, wherein said authenticator instructs said timer to measure two or more times said time interval between transmission of a said request and reception of said response, and if a measurement value obtained as a result of predetermined statistical processing exceeds a predetermined value, said authenticator does not share said exchange key with said content transmission apparatus.

5. A content transmission apparatus comprising:
an authenticator adapted 1) to perform an authentication for a content reception apparatus, and 2) to share an authentication key with said content reception apparatus, and 3) to send a request for transmission range acknowledgement and authentication information to said content reception apparatus, and 4) to receive a response transmitted from said content reception apparatus responding to said request for transmission range acknowledgement, and 5) to share said exchange key with said content reception apparatus; and
a timer used for measuring a time interval between transmission of a said request for transmission range acknowledgement to said content reception apparatus and reception of said response transmitted from said content reception apparatus responding to the transmission of said request for transmission range acknowledgement;
wherein, said authenticator instructs said timer to measure said time interval between said transmission of said request and said reception of said response, and if a measurement value of said time interval exceeds a predetermined value, said authenticator does not share said exchange key with said content reception apparatus so that a range of the distribution of said content is limited within a house; and
wherein, said response of said request for transmission range acknowledgement from said content reception apparatus includes a data generated based on said authentication information and said authentication key, and if said data is incorrect, said authenticator does not share said exchange key with said content reception apparatus.

6. A content reception apparatus comprising:
an authenticator adapted 1) to perform an authentication for said content transmission apparatus, and 2) to share an authentication key with said content transmission apparatus, and 3) to send a request for transmission range acknowledgement and authentication information to said content transmission apparatus, and 4) to receive a response transmitted from said content transmission apparatus responding to said request for transmission range acknowledgement, and 5) to share an exchange key with said content transmission apparatus; and a timer used for measuring a time interval between transmission of a said request for transmission range acknowledgement to said content transmission apparatus and reception of a said response transmitted from said content transmission apparatus responding to the transmission of said request for transmission range acknowledgement;

wherein, said authenticator instructs said timer to measure said time interval between said transmission of said request and said reception of said response, and if a measurement value of said time interval exceeds a predetermined value, said authenticator does not share said exchange key with said content transmission apparatus so that a range of the distribution of said content is limited within a house; and wherein, said response of said request for transmission range acknowledgement from said content transmission apparatus includes a data generated based on said authentication information and said authentication key, and if said data is incorrect, said authenticator does not share said exchange key with said content transmission apparatus.

7. A content transmission method carried out by a processing unit hardware, for transmitting a content between a content transmission apparatus and a content reception apparatus which are connected to each other by way of a network, said content transmission method comprising:

performing an authentication for a content reception apparatus and sharing an authentication key with said content reception apparatus;

sending a request for transmission range acknowledgement and authentication information to said content reception apparatus and receiving a response from said content reception apparatus for the transmission of said request for transmission range acknowledgement;

measuring a time interval between transmission of said request for transmission range acknowledgement to said content reception apparatus and reception of said response from said content reception apparatus for the transmission of said request for transmission range acknowledgement;

generating an exchange key and sharing said exchange key with said content reception apparatus; and encrypting content to be transmitted to said content reception apparatus based on said exchange key;

wherein, if a measurement value produced by said measuring time interval exceeds a predetermined value, said exchange key is not shared with said content reception apparatus so that a range of the distribution of said content is limited within a house; and wherein, said response of said request for transmission range acknowledgement from said content reception apparatus includes a data generated based on said authentication information and said authentication key, and if said data is incorrect, said exchange key is not shared with said content reception apparatus.

8. The content transmission apparatus according to claim 1, wherein the accompanying authentication information transmitted with the request for transmission range acknowledgement, is an acknowledgement value to be processed using said key at said content reception apparatus, and wherein said data of said response contains a result of the acknowledgement value processed using said key at said content reception apparatus, and said data is incorrect if the result of the acknowledgement value processed using said key at said content reception apparatus does not match a result of the acknowledgement value processed using said key at said content transmission apparatus.

* * * * *